(12) United States Patent
Nicholson (10) Patent No.: US 9,745,135 B1
(45) Date of Patent: Aug. 29, 2017

(54) CABLE CONVEYOR DISC

(71) Applicant: INTRACO, INC., Oskaloosa, IA (US)

(72) Inventor: Eric L. Nicholson, Oskaloosa, IA (US)

( * ) Notice: Subject to any disclaimer, the term of this patent is extended or adjusted under 35 U.S.C. 154(b) by 0 days.

(21) Appl. No.: 15/422,549

(22) Filed: Feb. 2, 2017

(51) Int. Cl.
*B65G 19/22* (2006.01)
*B65G 19/20* (2006.01)
*B65G 19/14* (2006.01)

(52) U.S. Cl.
CPC ............. *B65G 19/22* (2013.01); *B65G 19/14* (2013.01)

(58) Field of Classification Search
None
See application file for complete search history.

(56) References Cited

U.S. PATENT DOCUMENTS

| | | | |
|---|---|---|---|
| 3,586,155 A * | 6/1971 | Turrentine | B65G 19/14 119/901 |
| 4,031,857 A | 6/1977 | Jones | |
| 4,195,725 A | 4/1980 | Jones | |
| 4,197,938 A | 4/1980 | Klinkenberg | |
| 6,138,697 A | 10/2000 | Horger | |
| 6,267,227 B1 | 7/2001 | McGoun | |
| 9,302,854 B2 | 4/2016 | Nicholson | |
| 2011/0048559 A1 | 3/2011 | Stutchbury | |
| 2014/0311872 A1 * | 10/2014 | Podevyn | B65G 19/14 198/728 |

* cited by examiner

Primary Examiner — Kavel Singh (57) ABSTRACT

A close tolerance disc for a flexible member conveyor including a disc body member and a movable resilient ring. The ring is preferably formed of a durable polymer interlocking ring where the ring outer periphery closely matches the inside surface of the conveyor tubing. The resilience of the ring biases it to conform to the inside surface of the conveyor tubing to provide 100% conveyance of the material in the system. The ring can move in place within a groove in the body member of the disc, as well as distort to self-align and conform to the irregularities that are present in the manufacturing of the conveyor tubular components. The ring is easily removeable for quick replacement and cleaning. The interlocking ends of the ring keep the ring ends in place and in line to prevent the ends from being misaligned while passing through a partially cutaway portion of the tube.

14 Claims, 9 Drawing Sheets

CABLE CONVEYOR DISC

BACKGROUND OF THE INVENTION

Field of the Invention

The present invention relates to the field of cable conveyors, and more particularly to the discs that are attached to the cable travelling through a tubular circuit.

Description of the Related Art

As can be seen by reference to the following U.S. Pat. Nos. 3,905,473, 4,071,136, 4,395,973 and 7,267,218, (all hereby incorporated herein by reference in their entirety), the prior art is replete with myriad and diverse cable conveyor systems.

Cable conveyor systems have long been in use to transport materials from a charging location to discharging locations along the path of the conveyor. Discs attached at intervals to the cable, or other flexible member, travel within the tube to contact and move the material through the tube to desired locations within a facility.

The systems can, for example, wind through a building to have outlets wherever the user may wish to deliver the product being conveyed. There are unlimited possibilities of shapes of system and virtually an unlimited number of outlet opening locations for selectively delivering the material being conveyed to wherever desired. Typically, each outlet opening can be opened or closed individually.

The usual cable conveyor includes an endless cable with discs attached at even intervals. The discs have a diameter slightly smaller than the diameter of the tube through which the cable travels, such that the discs travel adjacent the interior wall of the tube. In order to avoid binding of the discs in the tube, the outside diameter of the discs is made smaller that the inside diameter of the tubes by a minimum of about 0.075". Discs have been formed of various materials including nylon and high molecular weight polyethylene.

Cable conveyors are used for numerous materials including industrial metal and plastic products, animal feed compositions, and human food items. When the conveyed material has a small particle size, material can pass through the gap between the disc and the tube wall, thus limiting the efficiency of the system.

As a consequence of the foregoing situation, there has existed a longstanding need for a new and improved cable conveyor disc and the provision of such a construction is a stated objective of the present invention.

BRIEF SUMMARY OF THE INVENTION

Briefly stated; the present invention provides a close tolerance disc for a flexible member conveyor including a disc body member and a movable resilient ring. The ring is preferably formed of a durable polymer interlocking ring where the ring outer periphery closely matches the inside surface of the conveyor tubing. The resilience of the ring biases it to conform to the inside surface of the conveyor tubing to provide 100% conveyance of the material in the system. The ring can move in place within a groove in the body member of the disc, as well as distort to self-align and conform to the irregularities that are present in the manufacturing of the conveyor tubular components. The ring is easily removeable for quick replacement and cleaning. The interlocking ends of the ring keep the ring ends in place and in line to prevent the ends from being misaligned while passing through a partially cutaway portion of the tube.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

Figure 1:
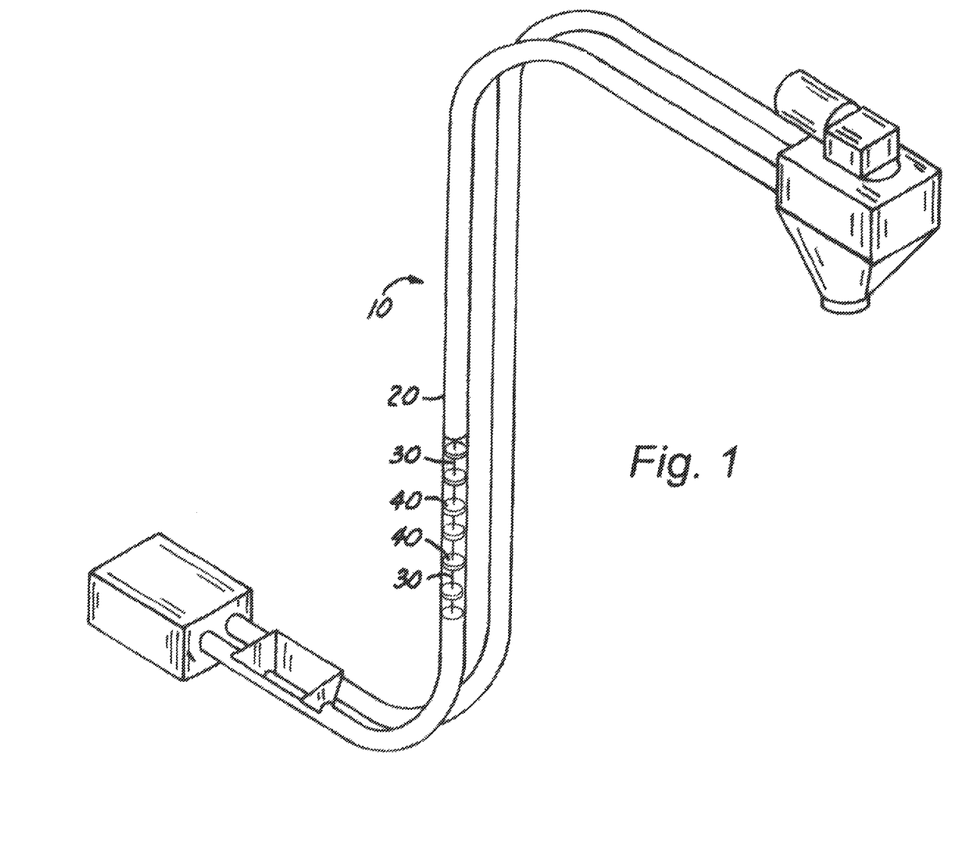
FIG. 1 is a perspective view illustrating a typical cable conveyor system using the discs of the present invention.

As can be seen by reference to the drawings, and in particularly to FIG. 1, the cable conveyor system that forms the basis of the present invention is designated generally by the reference number 10. The conveyor system 10 includes a tube 20, a cable 30 that moves within the interior of the tube 20, and a number of discs 40 spaced at intervals along the cable 30.

The tube 20 has an exterior wall 22, an interior wall 24, and an interior cavity 26 through which the cable 30 travels.

The disc 40 of the present invention has a body member 42 having a central portion 44 attached to the cable 30, and a peripheral edge 46 that has and annular groove 48 formed therein.

The term "disc", for the purposes of this document, is defined as any attachment on an endless loop tubular system which is larger than the cables, chains, etc. to which they are attached for the purpose of pushing material to be conveyed through the system. These "discs" are commonly circular at the outer periphery, but it is to be understood that the outer periphery could be of other non-circular shapes.

Endless loop "flexible members" for the purposes of this document are typically cables, but can include other structures such as chains, ropes, or the like.

The cross-sectional footprint of inside of tube may transition from circular to elliptical due to turns in the path of the tube. The resilient ring can transition between circular and elliptical since it can move with respect to the body member.

Figure 2:
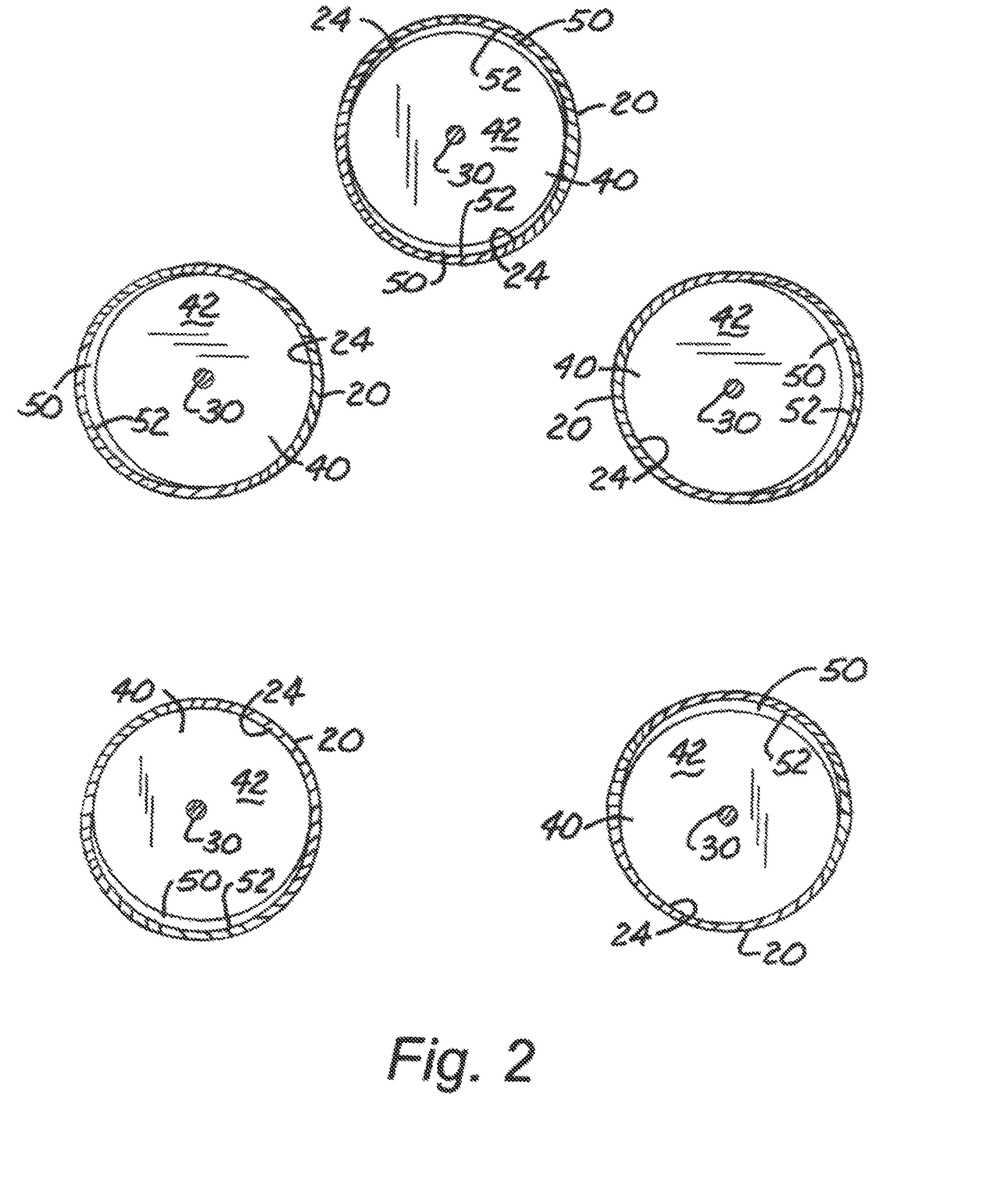
FIG. 2 is a series of five sectional views illustrating the disc of the present invention in sections of the tube that are distorted from a circular cross-section.
Figures 3, 4, 5:
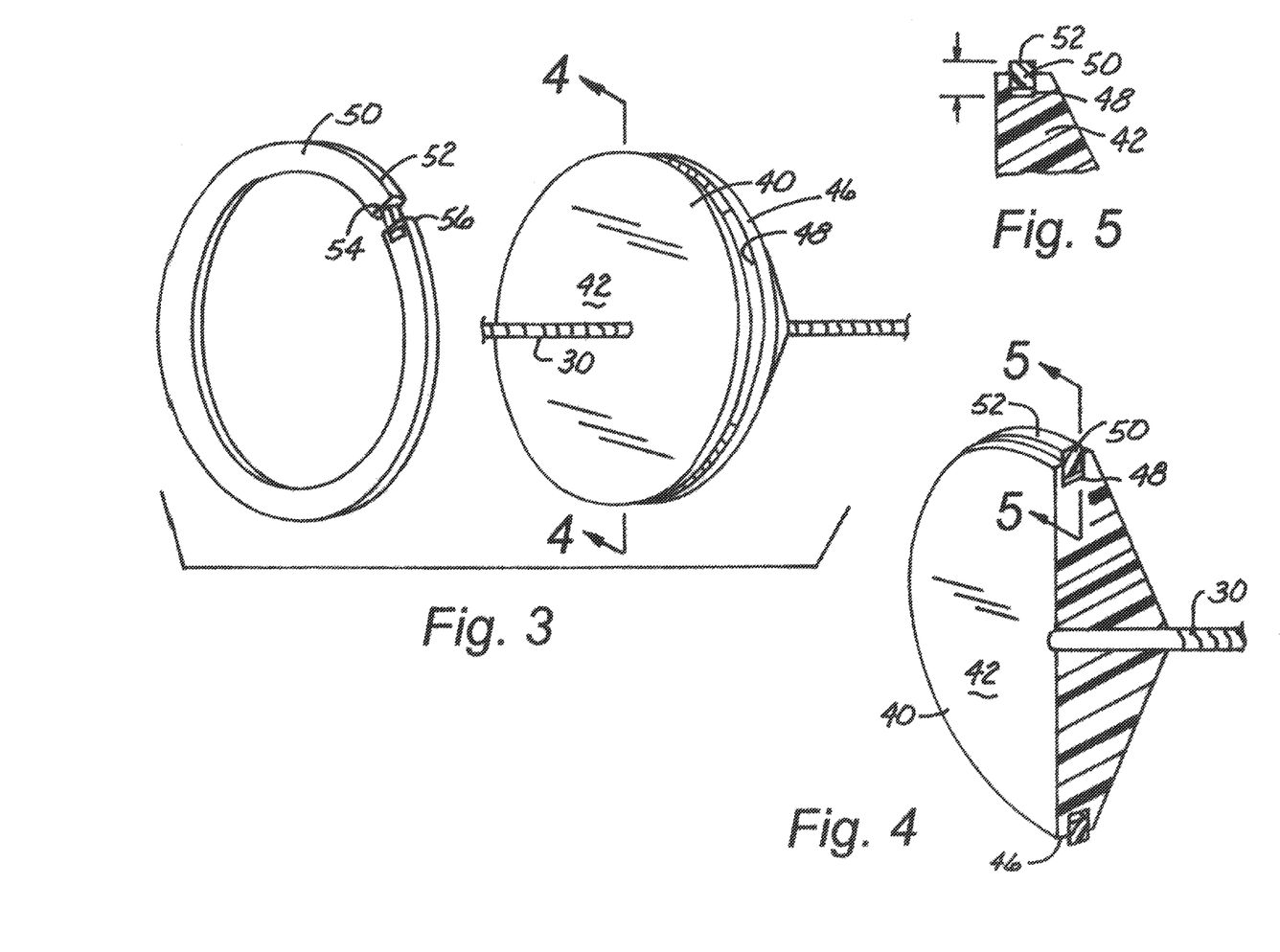
FIG. 3 is an exploded perspective view showing a first embodiment of the resilient ring and the groove in the body member of the disc disposed to slideably receive the ring.
FIG. 4 is a sectional view taken along line 4-4 of FIG. 3.
FIG. 5 is a sectional view taken along line 5-5 of FIG. 4.

As illustrated in FIGS. 3-5, a resilient ring 50 is slideably received in the groove 48 formed in the body member 42. The resilient ring 50 may be formed of a high molecular weight polymer or other material, including but not limited to metal. Such metal could be spring steel of the type used in metal snap rings that are biased by the nature of the metal to a specific shape, but the outer periphery can be pushed radially inwardly, for example by the interior surface of a tube through which it would be traveling. The outside circumference 52 of the ring 50 closely matches the inside surface 24 of the tube with a tolerance preferably in the range of 0.000 to 0.015 inches. The resilience of the ring 50 biases it to constantly contact the inside surfaces 24 even when the tube 20 has a cross-sectional footprint that transitions from circular to elliptical or other non-circular shapes. These variances in cross-sectional shape are due to imperfections in the manufacturing and assembly of the cable conveyor system 10. FIG. 2 illustrates a variety of conditions where the tube 20 is non-circular, but the outside circumference 52 of the ring remains in constant contact with the inside surface 24 of the tube 20. The ring 50 moves as it is slideably received in the groove 48 and distorts to self-align and conform to irregularities in the tube 20.

Figure 6:
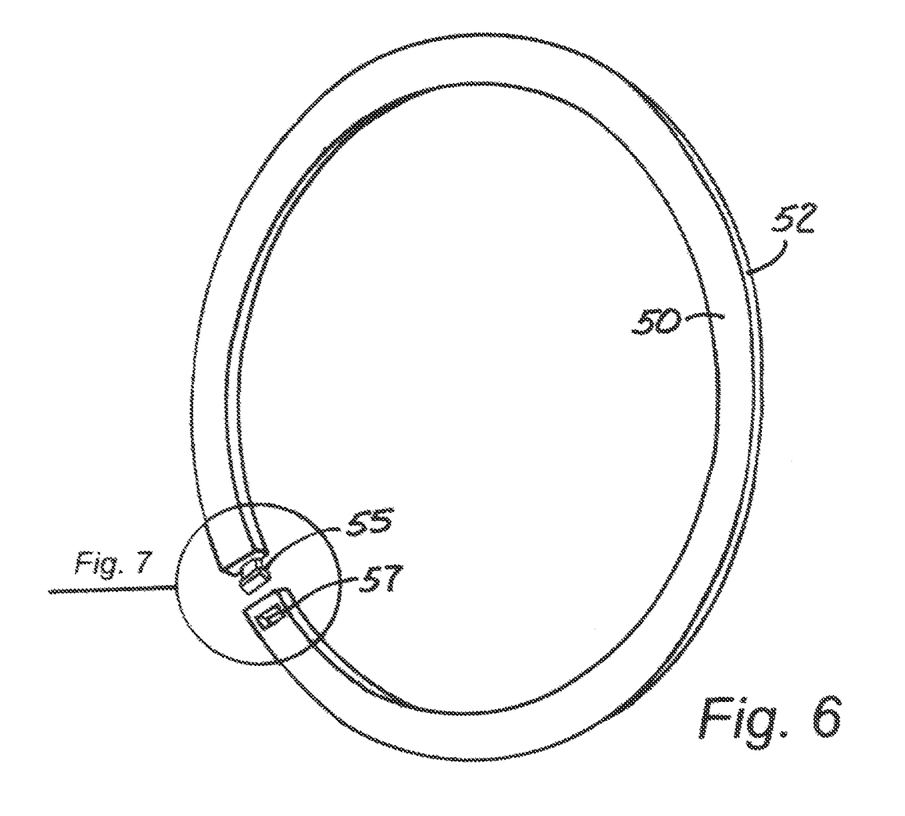
FIG. 6 is a perspective view of a second embodiment of the resilient ring.
Figure 7:
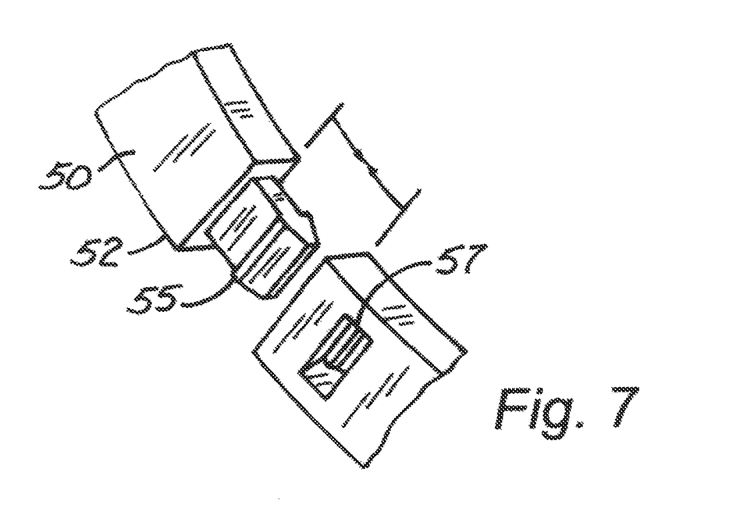
FIG. 7 is an enlarged perspective view of the end connectors of the ring shown in FIG. 6.
Figure 8:
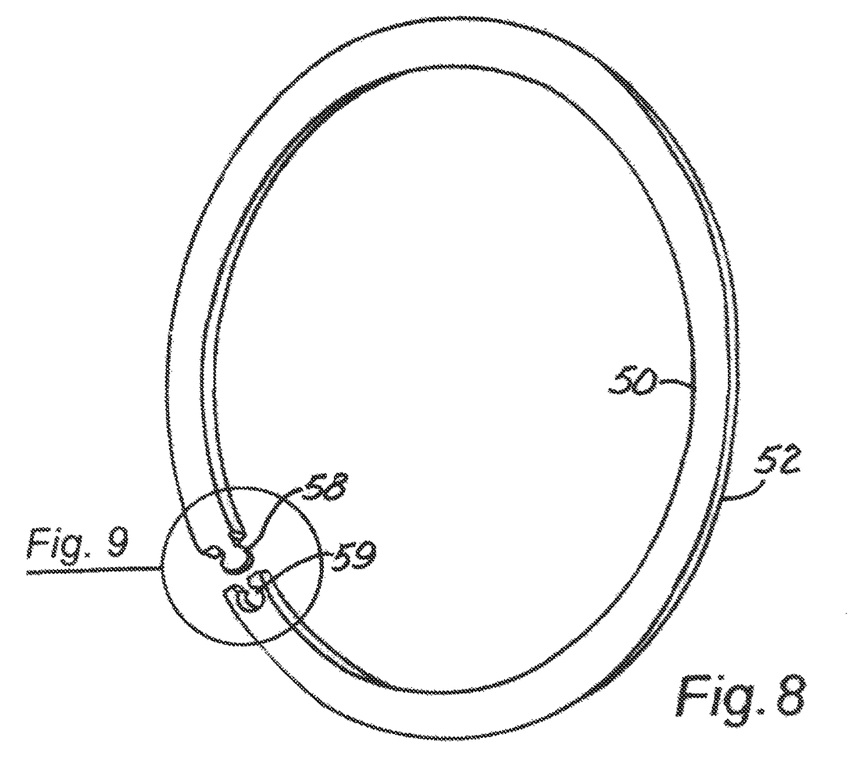
FIG. 8 is a perspective view of a third embodiment of the resilient ring.
Figure 9:
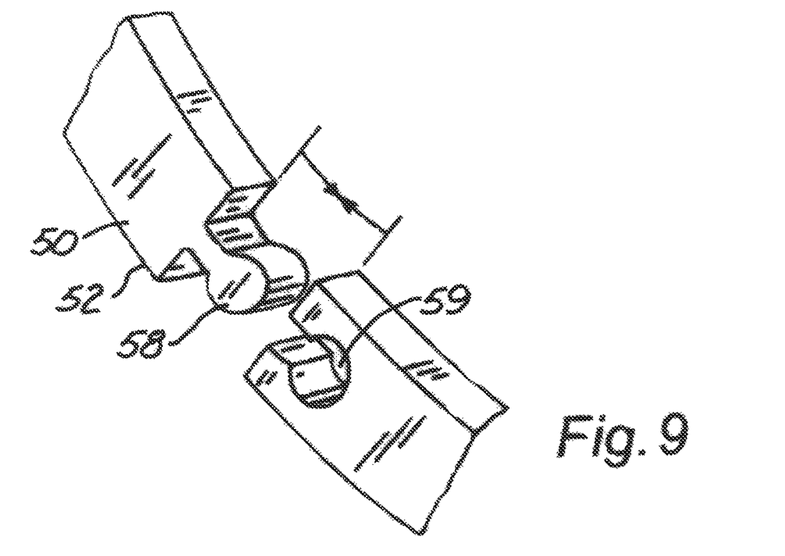
FIG. 9 is an enlarged perspective view of the end connectors of the ring shown in FIG. 8.
Figures 10, 11:
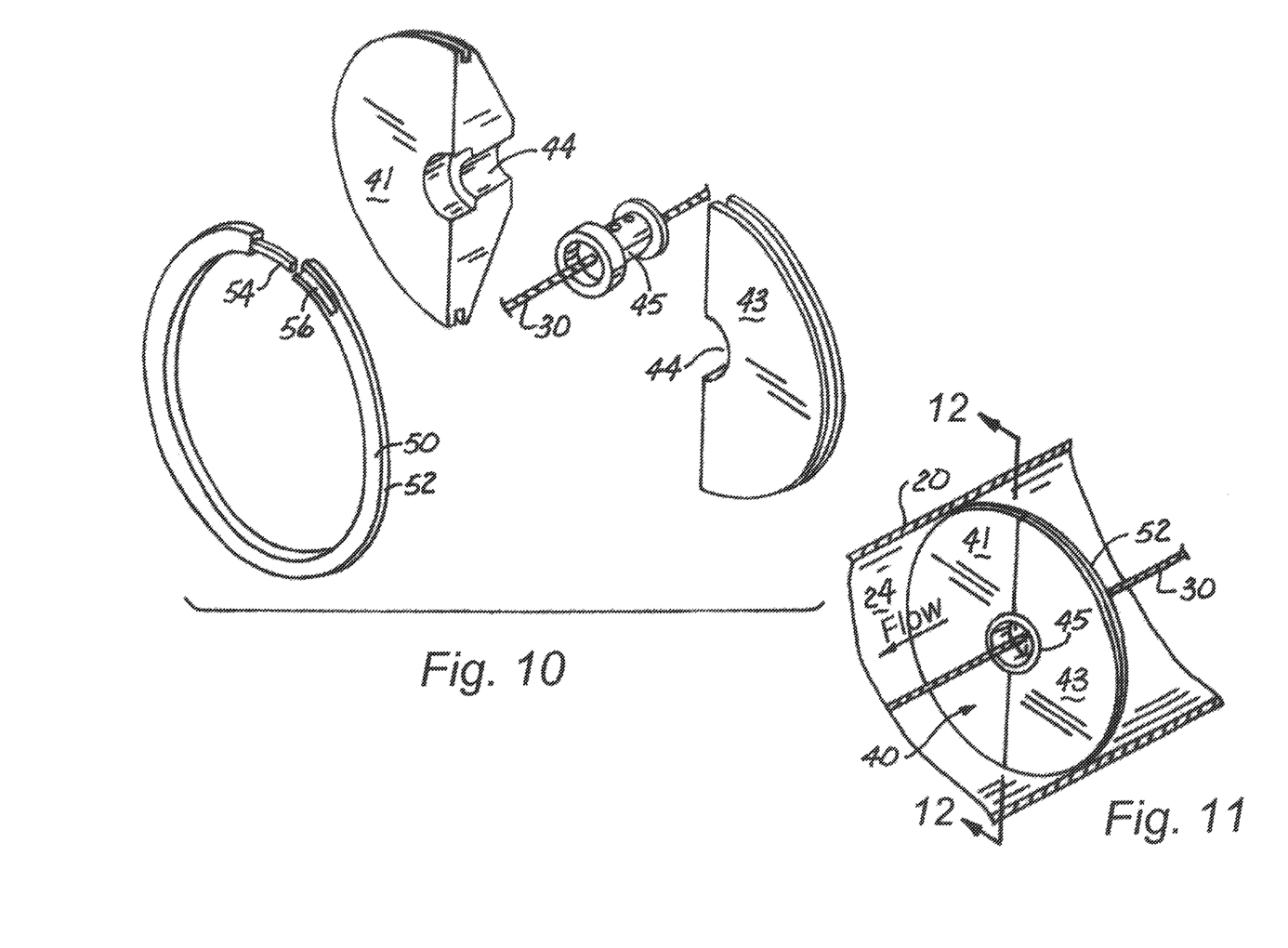
FIG. 10 is an exploded perspective view of the first embodiment of the resilient ring used with a two-piece body member.
FIG. 11 is a cutaway perspective view showing the two-piece body member in a section of tube.
Figure 12:
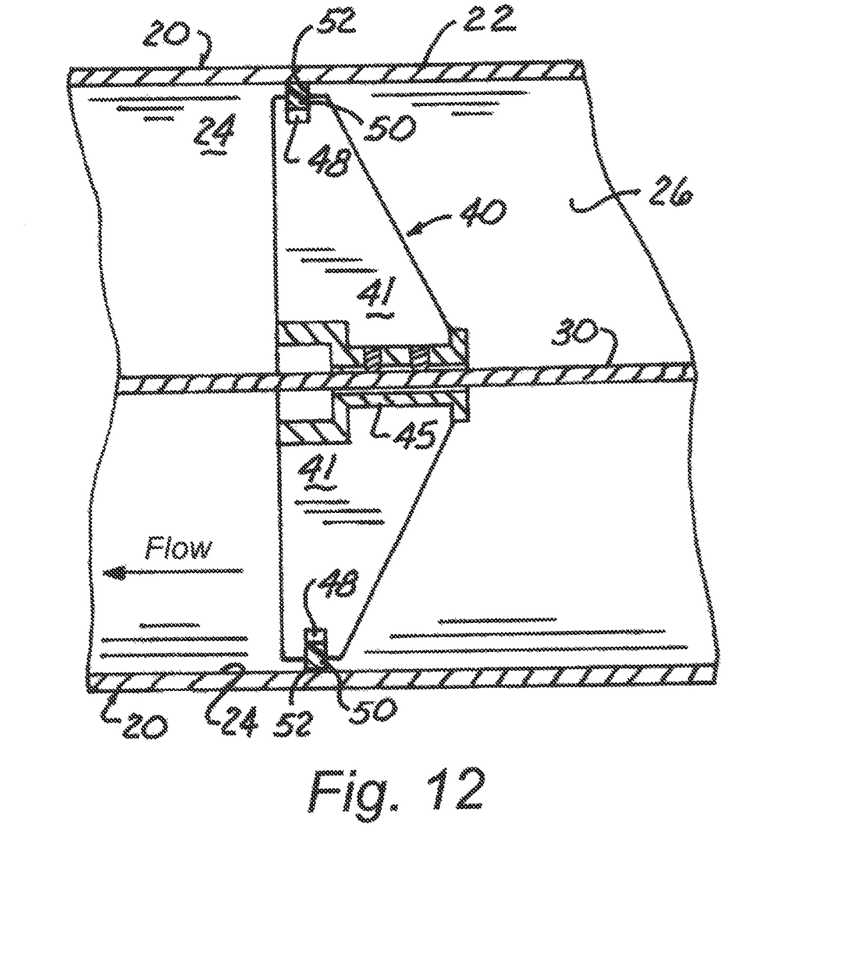
FIG. 12 is a sectional view taken along line 12-12 of FIG. 11.
Figure 13:
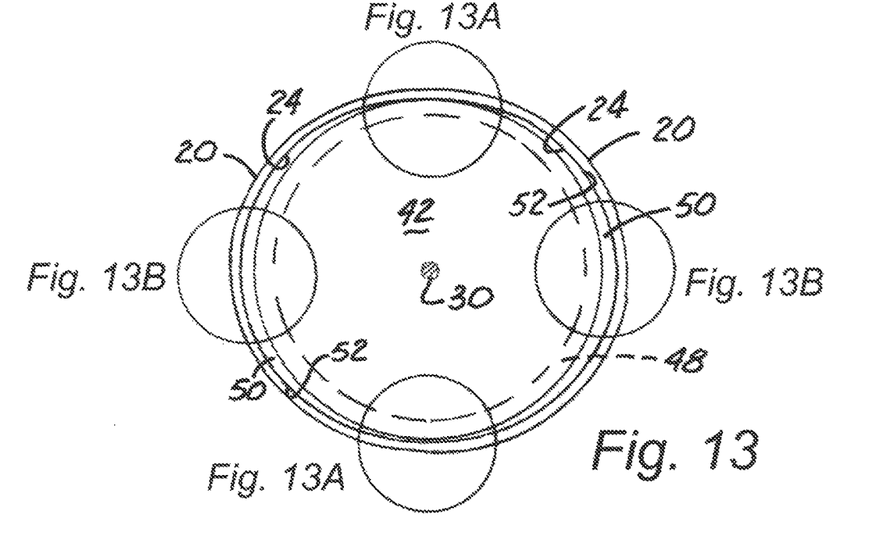
FIG. 13 is a cross-sectional view illustrating the disc of the present invention in a section of the tubing that is distorted to an elliptical shape.
Figure 13A:
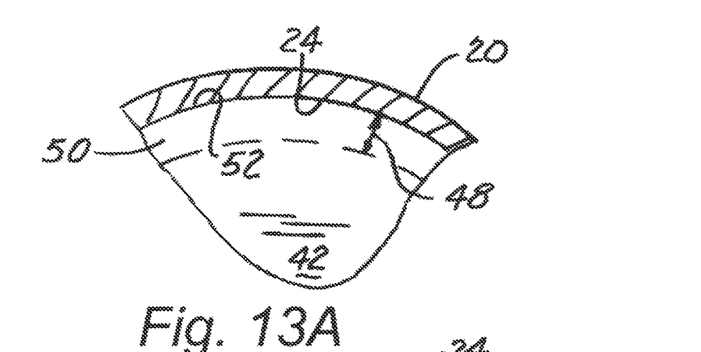
FIG. 13A is an enlargement of circled portion 13A of FIG. 13.
Figure 13B:
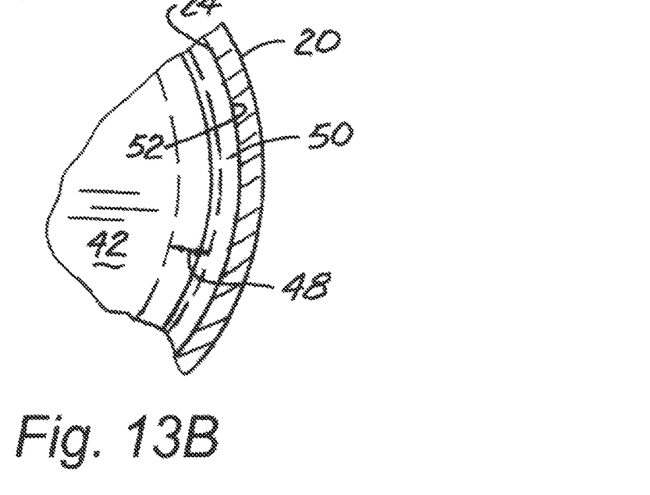
FIG. 13B is an enlargement of circled portion 13B of FIG. 13.

FIGS. 3-5 show a first embodiment of the ring 50 having interlocking ends 54 and 56 that facilitate rapid replacement and cleaning. FIGS. 6 and 7 show a second embodiment of the ring 50 with interlocking ends 55 and 57; and FIGS. 8 and 9 show a third embodiment of the ring 50 with interlocking ends 58 and 59. FIGS. 10-12 illustrate the first embodiment of the ring 50 used with a two-piece body member 41 and 43 carried on a collar 45 fixed to the cable 30. A disc 40, such as the one shown in FIG. 12, may be installed into a prior art system, in addition to the existing prior art discs, for the purpose of cleaning away any buildup of material on the interior surface 24 of the tube 20. FIG. 13 illustrates the resilient ring 50 in constant contact with the interior surface 24 of a tube having an elliptical cross-sectional shape. FIGS. 13A and 13B show certain parts of FIG. 13 enlarged.

Figure 14:
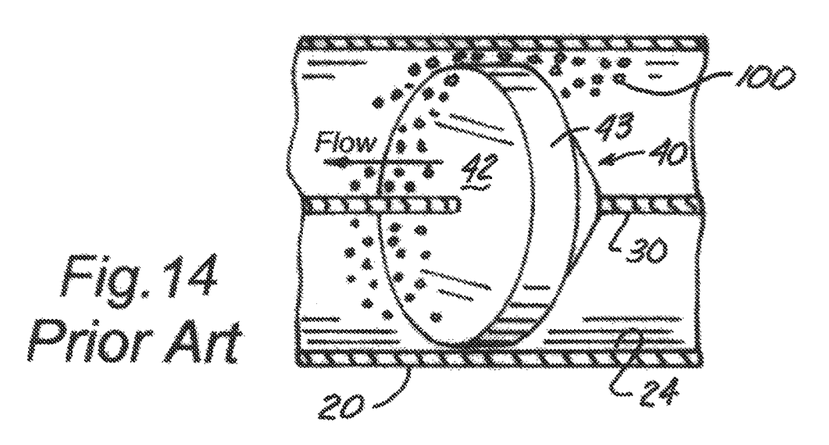
FIG. 14 is a cutaway perspective view showing a prior art disc in a cable conveyor system.

FIG. 14 shows the prior art system where the outer periphery 3 of the disc 40 is sized a minimum of 0.075-inches smaller than the interior surface 24 of the tube 20 to prevent binding and excess drag in the system. This relatively large tolerance, however, results in the backflow of small particle matter 100 through the gap between the disc 40 and the tube 20.

The present invention incorporating the resilient ring so results in a cable conveyor system having the following advantages over the prior art:

1) Reduces product build-up on the tube interior surface. The design gives a scraping action which "cuts" the products from the tube rather than a wiping action which naturally tends to mash product in the tube.
2) The edge of the ring is "self-sharping" as the outer ring surface wears due to friction.
3) There is a reduced rollback of product in a vertical tube, hence less damage to friable or fragile products or any product which might wedge between a disc outer surface and tube interior surface.
4) The reduced rollback in a vertical tube yields a more even flow of product and more even cable pull.
5) A movable resilient ring better conforms to the tube interior surface. Solid discs vary in outside dimension, while tubes, inlets, outlets and all other components through which discs pass, vary in interior dimensions. Thus, perfectly matching the disc outside surface and the tube interior surface is basically impossible.
6) Product input will equal product output. A given product weight put into the system should equal the product weight exiting the system within any given time.
7) "Pockets" of product in sweeps or sagging "straight" line tubes will be reduced or eliminated.
8) System cable pull force will be reduced. Friction of tight fitting solid discs is reduced with the use of discs with moveable resilient rings.
9) Component costs will be reduced as "tight" tolerances on the tube and sweeps interior dimensions and disc outside dimensions will not be required to achieve "complete" product conveyance, to reduce product damage and to eliminate product buildup on the tubes interior surface.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

The invention claimed is:

1. A disc for attachment to a flexible member movable through a tube to convey material disposed within interior walls of the tube, the disc comprising:
   a body member attached to the flexible member; and
   a resilient ring moveably attached to the body member, the ring being outwardly biased to constantly contact the interior wall of the tube as the disc moves through the tube; and
   wherein the body member includes a grove, and wherein the ring is slideably and radially moveable with respect to the body member in the groove, thereby permitting movement of the ring with respect to the body member to keep the ring in constant contact with the interior wall of the tube.

2. The disc of claim 1, wherein the groove is formed in an outer peripheral edge of the body member.

3. The disc of claim 1, wherein the resilient ring includes opposing ends attached by interlocking connectors.

4. The disc of claim 2, wherein the resilient ring includes opposing ends attached by interlocking connectors.

5. The disc of claim 1, wherein the resilient ring is formed of high molecular weight polyethylene.

6. The disc of claim 2, where in the resilient ring is formed of high molecular weight polyethylene.

7. A conveyor system comprising:
   an endless loop tubular system;
   an inlet for permitting material to be conveyed to be introduced into the endless loop tubular system;
   an endless loop flexible member;
   discs disposed on the endless loop flexible member for moving material along the endless loop tubular system, the discs having an outer periphery;
   a drive mechanism for causing the endless loop flexible member and discs to move in at least one direction through the endless loop tubular system;
   wherein at least one of the discs has an annular groove in the outer periphery thereof; and
   a substantially annular ring disposed at least partially in and extending partially out of the annular groove, the ring being moveable with respect to the one of the discs in the groove.

8. The conveyor system of claim 7, wherein the ring is outwardly biased and slideably moveable within the groove.

9. The conveyor system of claim 7, wherein the ring includes opposing ends attached by interlocking connectors.

10. The conveyor system of claim 8, wherein the ring includes opposing ends attached by interlocking connectors.

11. The conveyor system of claim 7, wherein the ring is formed of high molecular weight polyethylene.

12. The conveyor system of claim 8, wherein the ring is formed of high molecular weight polyethylene.

13. The conveyor system of claim 8, wherein the ring is formed of metal.

14. The conveyor system of claim 8, wherein the ring is formed of spring steel.

* * * * *